United States Patent [19]
Vollum et al.

[11] 3,831,199
[45] Aug. 20, 1974

[54] COMMON TRANSPORT FOR MAGENTIC TAPE CARTRIDGE OR MAGNETIC CARD CARTRIDGE

[75] Inventors: Charles Howard Vollum; Sidney Hubert Broughton, both of Portland, Oreg.

[73] Assignee: Tektronix, Inc., Beaverton, Oreg.

[22] Filed: Mar. 19, 1973

[21] Appl. No.: 342,901

[52] U.S. Cl. .................... 360/94, 35/35 C, 360/130, 360/134

[51] Int. Cl. ..................... G11b 23/04, G11b 25/06

[58] Field of Search...179/100.2 Z, 100.2 S, 100.2 T; 235/61.11 D; 346/74 M; 35/35 C

[56] References Cited

UNITED STATES PATENTS

| | | | |
|---|---|---|---|
| 3,488,867 | 1/1970 | Lyon et al. | 35/35 C |
| 3,588,379 | 6/1971 | Young | 235/61.11 D |
| 3,610,635 | 10/1971 | Schiff et al. | 179/100.2 T |
| 3,692,956 | 9/1972 | Northrup | 179/100.2 S |

OTHER PUBLICATIONS

IBM Technical Disclosure Bulletin, F. C. Parry, Identification Card, Vol. 3, No. 6, November 1960, page 8.

*Primary Examiner*—Alfred H. Eddleman
*Attorney, Agent, or Firm*—Adrian J. La Rue

[57] ABSTRACT

A one-piece transport for receiving therein magnetic tape cartridge or magnetic card cartridge which includes latching means for latching either cartridge in position therein and switch means for actuating the driving capstan to drive the tape or card. The cartridges are provided with a one-piece pinch-roll spring for springably urging the tape or card against the driving capstan.

22 Claims, 13 Drawing Figures

COMMON TRANSPORT FOR MAGNETIC TAPE CARTRIDGE OR MAGNETIC CARD CARTRIDGE

BACKGROUND OF THE INVENTION

The present invention relates generally to transports for receiving magnetic tape cartridges therein and more particularly to transports of one-piece construction for receiving magnetic tape and magnetic card cartridges therein.

Transports for receiving magnetic tape cartridges therein are known, but they are made from several parts which makes their assembly difficult and costly and introduces varying tolerances that reduces the quality of reading or writing information onto or off the tape in the tape cartridge. The driving capstan of the known tape transports is made of metal and the pinch roll is made of rubber or a material having rubber-like characteristics which does not provide positive drive to drive the tape when the tape cartridge is disposed in the tape transport. Pinch-roll spring assemblies of existing tape cartridges comprise two or more parts and they do not apply uniform pressure onto the pinch roll thereby causing the tape to be improperly driven via the capstan and pinch-roll means along the read/write head.

Magnetic card readers are provided as part of electronic equipment for reading information stored onto a magnetic card to supply the information to the electronic equipment to operate same. Information may also be written onto the magnetic card. The same is true relative to tape readers, because they can be provided as part of electronic equipment in the same manner as magnetic card readers. It is not known to provide a transport means for receiving either a tape cartridge or a card cartridge to supply or store information to or from electronic equipment to provide optimum operation thereof.

SUMMARY OF THE INVENTION

The present invention provides a common transport for receiving a tape cartridge or a card cartridge therein and the tape and card cartridge is provided with a one-piece spring means for the pinch-roll means.

An object of the present invention is to provide a transport for receiving tape or card cartridges therein.

Another object of the present invention is the provision of a transport of one-piece construction of precision configuration for accurately positioning a tape or card cartridge therein.

A further object of the present invention is to provide switch means for the transport which are connected in series with the capstan motor means to actuate the motor means when the tape cartridge is inserted in the transport or when a magnetic card is inserted in the card receiving area of the card cartridge.

An additional object of the present invention is the provision of sensing means for sensing whether or not a magnetic card has information stored thereon and for selecting a certain area of a tape which contains desired information for use by the electronic equipment.

A still further object of the present invention is to provide the driving capstan with friction means in the form of rubber-like material to positively drive the tape or card.

Yet another object of the present invention is the provision of a card cartridge having a channel defining a path for guiding a magnetic card into engagement with the driving capstan.

Still an additional object of the present invention is to provide a one-piece pinch-roll frame and spring means for applying uniform pressure between pinch roll and driving capstan thereby precluding torsional problems of the spring means.

Yet a further object of the present invention is the provision of positioning means between the mounting means for the spring means and the spring means to prevent the pinch roll from engaging the tape or card cartridge housing thereby preventing the tape or card from being trapped between the pinch roll and housing.

BRIEF DESCRIPTION OF THE DRAWING

The above and other objects, features and advantages of this invention will become apparent from the following detailed description of illustrative embodiments which are to be read in conjunction with the accompanying drawings in which.

DETAILED DESCRIPTION OF PREFERRED EMBODIMENTS

Figures 1, 2:
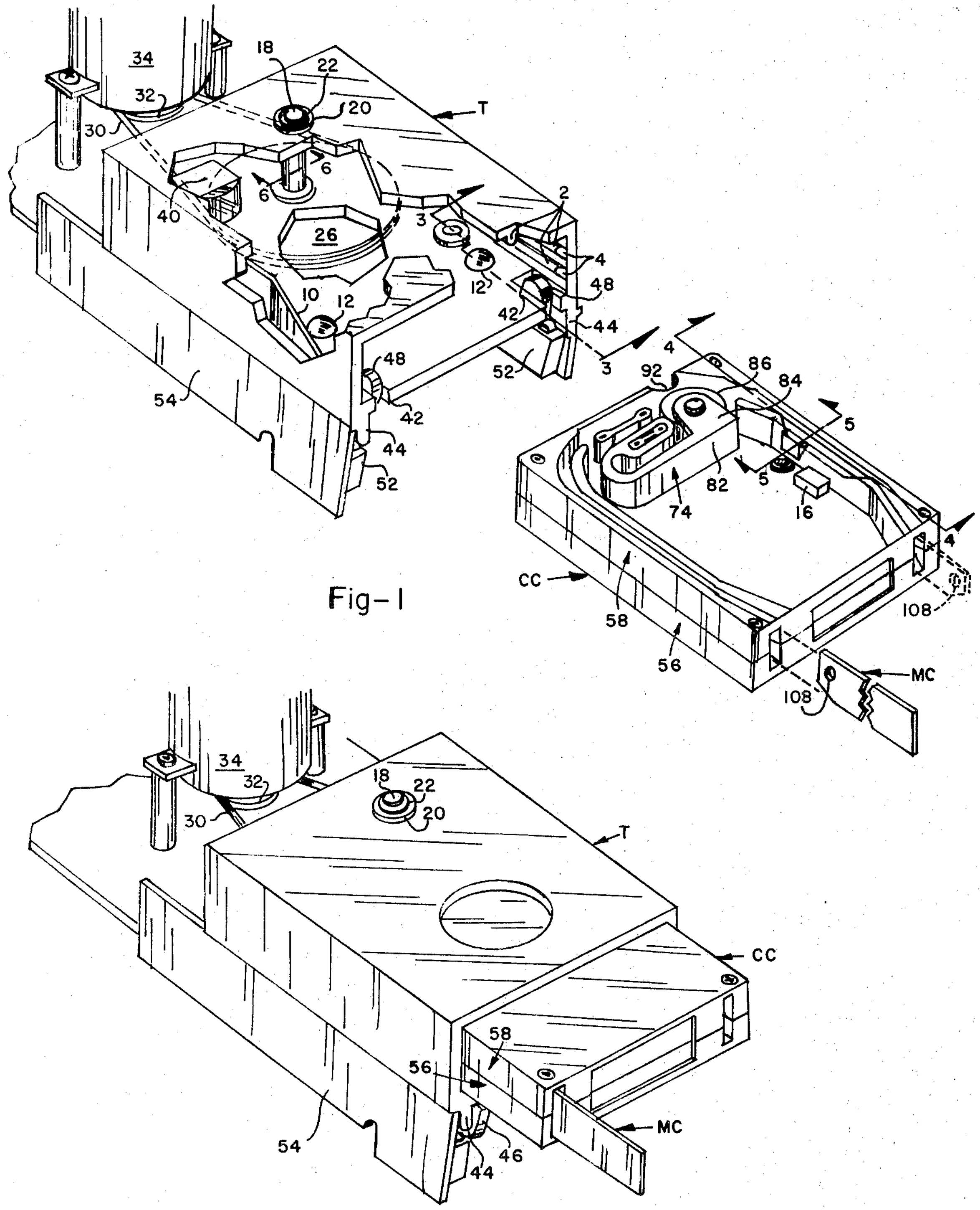
FIG. 1 is an exploded, perspective view with parts broken away of a transport, card cartridge and magnetic card.
FIG. 2 is a view similar to FIG. 1 with the parts thereof in an assembled condition.
Figures 3, 4:
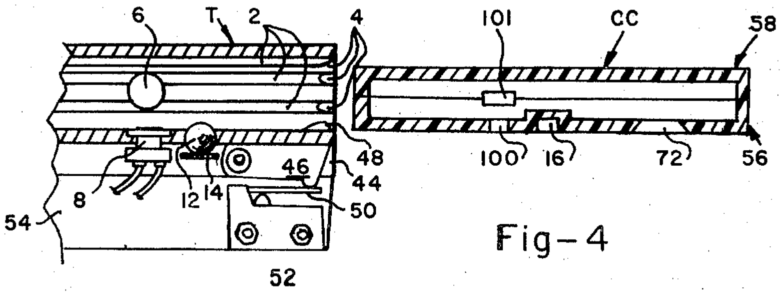
FIG. 3 is a cross-sectional view taken along line 3—3 of FIG. 1.
FIG. 4 is a cross-sectional view taken along line 4—4 of FIG. 1.
Figure 5:
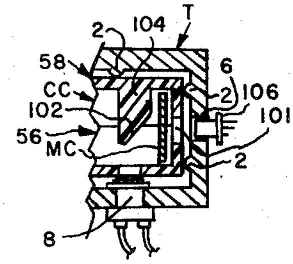
FIG. 5 is a view taken along line 5—5 of FIG. 1.
Figure 6:
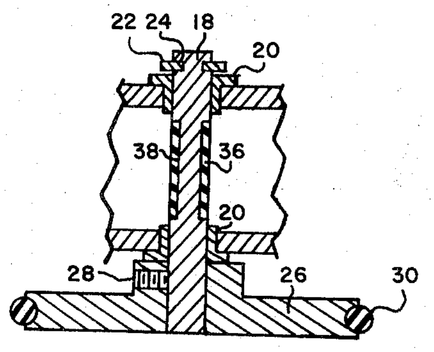
FIG. 6 is a cross-sectional view taken through the driving capstan.

As shown in FIGS. 1–6, a transport T is a one-piece rectangular-shaped member which is preferably extruded from aluminum so that its configuration is carefully controlled. The interior surface of one side and the top of transport T are provided with spaced ridges 2 which have beveled surfaces 4 at the entrance to transport T to facilitate the insertion of card cartridge CC or tape cartridge TC within the transport and ridges 2 reduce the friction of movement of these cartridges therewithin. A hole 6 is located in the side containing ridges 2, and it is in alignment with a light source 8 disposed in the bottom of transport T. A V-shaped spring 10 is secured along the interior surface of the other side of transport T to urge the card or tape cartridge against ridges 2 to properly align them when inserted in the transport. It is possible to make the transport into two extruded sections which are assembled to form a transport having the rigid tolerances of the one-piece construction and still be for all intents and purposes a transport of one-piece construction since the configuration in this regard would be carefully controlled.

Ball detents 12 are disposed in the bottom of transport T and they are urged upwardly via spring 14 for engagement with latching recesses 16 located in the bottom of the card and tape cartridges to latch the cartridges in position in the transport, as well as to urge them against spaced ribs 2. Alternatively, a plastic member in the form of a beam can have its center area secured to the bottom of transport T and the outer ends thereof can have projections at right angles extending through the openings in which ball detents are located and the projections can have arcuate surfaces projecting above the inside surface so that they can be cammed downwardly when the card or tape cartridges engage them and the spring characteristics of the plastic material causes them to engage in latching recesses 16. The spring 10 and ball detents 12 or plastic spring projections urge the cartridges against ridges 2 to properly register the cartridges with the read/write head and the driving capstan.

A driving capstan 18 is rotatably mounted in bearings 20 secured in the top and bottom of transport T. A spring clip 22 is disposed in a groove 24 in the top of capstan 18 to secure it within bearings 20. A pulley 26 is secured onto capstan 18 via a set screw 28, and pully 26 has an endless driving belt 30 disposed thereon which is also in engagement with pulley 32 secured onto the shaft of motor 34. A rubber-like material 36, which is preferably silicone rubber, is secured within an annular recess 38 in capstan 18. The area of capstan 18 containing rubber-like material 36 defines a driving area. The rubber-like material 36 provides excellent friction when in engagement with the magnetic card MC or the magnetic tape MT to positively drive same with very minimized slippage.

A read/write head 40 is mounted at the inner end of transport T for engagement with the magnetic card or magnetic tape when either the card or tape cartridge is disposed within the transport to read information from or write information onto the magnetic card or tape as desired via conventional electronic circuitry (not shown).

Slots 42 are located at the entrance to transport T in the bottom thereof adjacent the sides. Projections 44 extend outwardly from the bottom of transport T outwardly from slots 42 and they have switch-actuating members 46 pivotally mounted on the inside of projections 44. Arcuate sections 48 are provided on members 46 and they are disposed in respective slots 42. Sections 48 protrude above the inside surface of the bottom of transport T and they are maintained in this normal position of operation via spring-biased arms 50 of switches 52 which are secured on the sides of mounting frame 54. Motor 34 is secured on mounting frame 54 and the sides of frame 54 are secured to respective projections 44. Switches 52 are connected in series with motor 34 and they are actuated by switch-actuating members 46 when a magnetic card MC is moved through card cartridge CC disposed in transport T as hereinafter described or when tape cartridge TC is disposed in transport T.

Card cartridge CC, as best shown in FIGS. 1, 2, 4, 7 and 8, includes a bottom section 56 and a top section 58 which are preferably molded from ABS plastic or other suitable plastic material. Bottom sections 56 and 58 are provided with projections 60, 62, 64, 66, 68 and 70 which when sections 56 and 58 are assembled together define a path along which a magnetic card MC moves. Openings 72 are disposed in bottom section 56 between projections 60, 62 and 66, 68 so that arcuate sections 48 of switch-actuating members 46 are disposed in the path in order to actuate motor 34 to drive magnetic card via driving capstan 18 and the pinch roll. Thus, one of switches 52 is actuated when the magentic card is inserted within the path to actuate motor 34 and the other switch 52 is actuated when the magnetic card is being driven out of the card cartridge in order to make sure the magnetic card is completely driven in and out of the card cartridge.

Pinch-roll frame and spring 74 is a one-piece member which is preferably molded from DELRIN plastic and it includes a mounting section 76 having an opening 78 which is mateable with mounting member 80 extending out of bottom section 56. A spring section 82 extends out from mounting section 76 and it has a U-shaped frame 84 at its free end in which is rotatably mounted a metal pinch roll 86 which is preferably made of aluminum or other suitable hard material. A projection 88 on mounting section 76 is engaged by projecting section 90 on the inside surface of spring section 82 which define positioning means to prevent pinch roll 86 from engaging projections 64 and 68 between which is provided an opening 92 to enable the driving area 36 of capstan 18 to engage pinch roll 86 in the case of card cartridge CC so that the pressure applied via spring section 82 is uniform between driving area 36 and pinch roll 86 thereby precluding torsional problems and as a result this will accurately drive the magnetic card when it is disposed between driving area 36 and pinch roll 86. Slippage is substantially minimized due to driving area 36 of capstan 18 being of rubber-like material and pinch roll 86 being of hard material which contributes significantly to the driving accuracy of the magnetic card.

Figure 12:
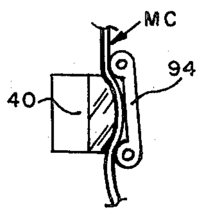
FIG. 12 is a schematic illustration of the read/write head in position in the card cartridge.

A card guide 94 is made preferably of DELRIN plastic or the like, and it is maintained in position by holes therein engaging integral pins 96 (shown in FIG. 8) on sections 56 and 58 when secured together. Card guide 94 is disposed in alignment with opening 98 located between projections 60 and 64 through which read/write head protrudes when the card cartridge is disposed in transport T, and it provides wrap-around of the magnetic card MC so that the magnetic card wraps around read-write head 40 as illustrated in FIG. 12 to enable the read/write head to read information from or write information accurately onto the magnetic card.

A hole 100 extends through the bottom of bottom section 56 in alignment with a 45° reflecting surface 102 on projection 104 of top section 58 which in turn is in alignment with opening 101 in the side of the card cartridge. When card cartridge CC is disposed in transport T, hole 100, opening 101 and reflecting surface 102 are disposed in alignment with light source 8 and hole 6, and light is received by a photo transistor 106 when reflected off reflecting surface 102.

Magnetic card MC is made of a suitable plastic material with one side being coated with material to enable it to store information thereon and card MC has a length substantially longer than its width and its thickness is such to provide the card with sufficient stiffness but with the proper flexibility to enable the card to be readily driven along the path of the card cartridge and be wrapped around the read/write head 40 via card guide 94. The card preferably has a length to width ratio of 14:1, but it can effectively operate with a 9:1 ratio. The leading end of the card is beveled along one edge to facilitate insertion of the card into the path of the card cartridge and a hole 108 is provided inwardly from the leading end.

Figure 13:
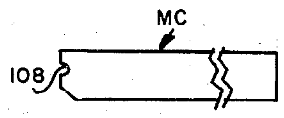
FIG. 13 is a side elevational view of the end of the magnetic card that has had part of the end removed.

As long as photo transistor 106 receives light from light source 8 via reflecting surface 102, the photo transistor will supply a signal to appropriate circuitry (not shown) that no information is being processed from the card. When the leading end of the card passes between reflecting surface 102 and photo transistor 106, the light will be interrupted then light will pass through hole 108 and the light will once again be interrupted by the card. The intermittent light received by photo transistor 106 will provide a signal that information is to be stored on the magnetic card from the read/write head and, once this information is stored on the card, the leading end of the card is cut off through hole 108, as shown in FIG. 13, so that, when the card is processed through the card cartridge thereafter, the non-intermittency of the light will enable the photo transistor to provide a signal that the information on the card is to be read out therefrom via read/write head 40. Thus, the cut end of the leading end of a magnetic card will constitute a program.

Figure 11:
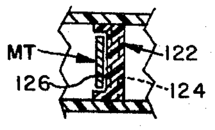
FIG. 11 is a cross-sectional view taken along line 11—11 of FIG. 9.
Figures 7, 8, 9, 10:
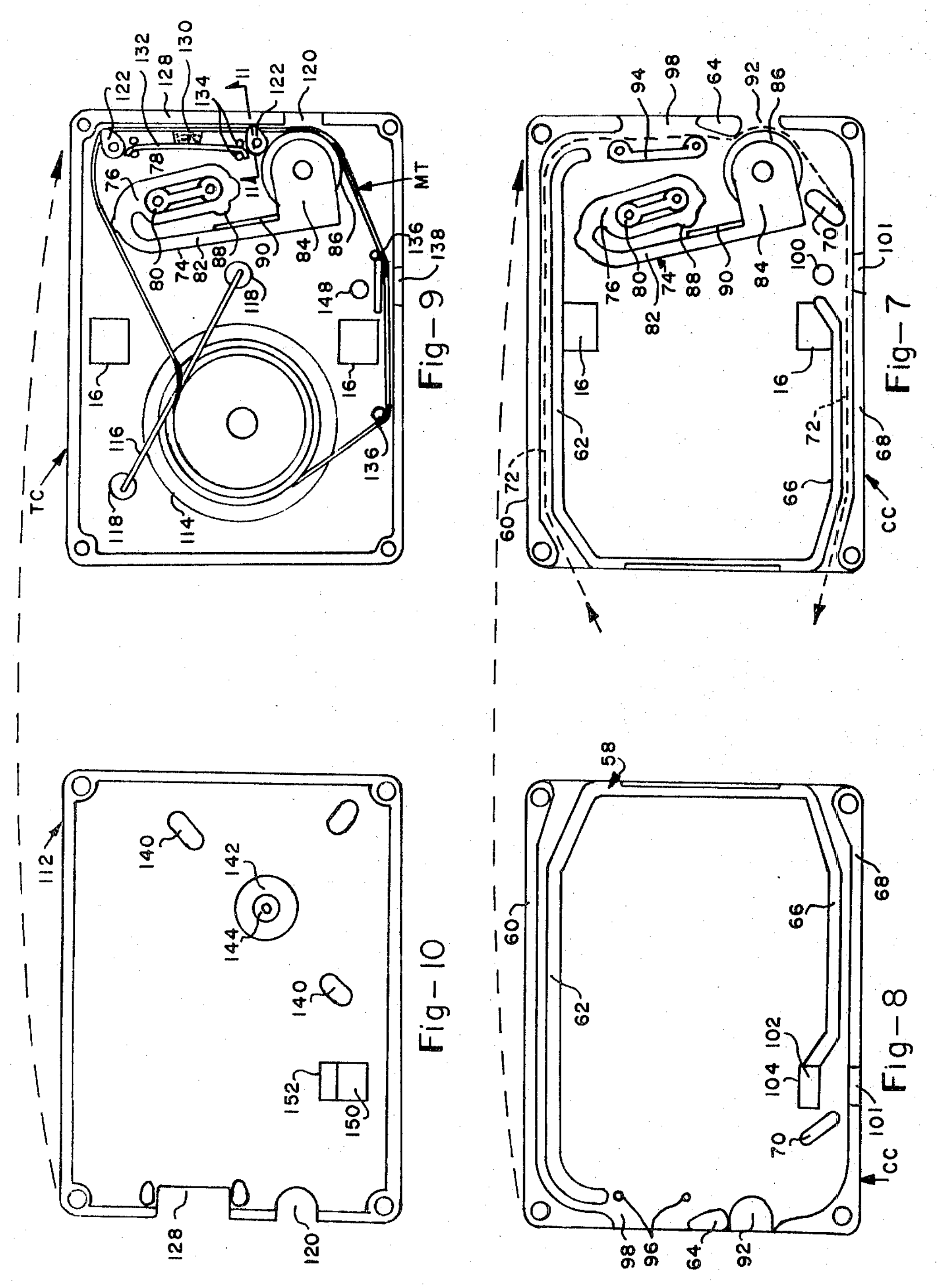
FIG. 7 is a top plan view of the bottom section of the card cartridge with the upper section removed therefrom.
FIG. 8 is a top plan view of the upper section of the card cartridge.
FIG. 9 is a top plan view of the bottom section of the tape cartridge with the upper section removed therefrom.
FIG. 10 is a top plan view of the upper section of the tape cartridge.

Tape cartridge TC as shown in FIGS. 9–11 comprises a bottom section 110 and a top section 112 molded preferably from ABS plastic or other suitable plastic material. Bottom section 110 is provided with a reel 114 on which an endless magnetic tape MT is disposed. The tape feeds off reel 114 as a result of passing over rod 116 which is secured in projections 118 when driving capstan 18 engages the tape through opening 120 and via the pressure of pinch roll 86 to frictionally drive the tape. Pinch-roll frame and spring 74 is also used in the tape cartridge in the same manner as the card cartridge and it is mounted therein in the same way in order to apply uniform pressure on the tape and drive same accurately with minimum slippage when the rubber-like driving area of the driving capstan drives the tape.

Tape guides 122 are disposed on integral pins 124 of bottom section 110 and they are keyed into position to maintain them therein. A recess 126 is located in the tape guides for receiving the tape therein. The tape guides are disposed on each side of opening 128 through which the read/write head 40 extends for engagement with the magnetic tape and to properly guide the tape along head 40. The spacing of the tape guides is such that the guide path is sufficiently long so that tape can properly register with read/write head 40 thereby eliminating any slewing of the tape relative to the read/write head as the tape is being drivenly guided thereby so that accurate information is written onto or read out from the tape. Rod 116 causes the tape to be turned 90° as it is fed from the inner area of the tape reel and the first tape guide turns is 90° back to its original disposition for being driven along the read/write head.

A pressure pad 130 secured on a spring 132 which has its ends mounted between pins 134 of bottom section 110 adjacent tape guides 122 presses the tape in engagement with read/write head 40. Projections 136 are provided by bottom section 110 to guide the tape by opening 138 and back onto reel 114. Projections 140 extend out from top section 112 to maintain the tape in position on reel 114 and annular projection 142 has a recess 144 into which the end of axle 146 onto which reel 144 is rotatably mounted is disposed.

A hole 148 extends through bottom section 110 in alignment with 45° reflecting surface 150 on projection 152 of top section 112 so that light from light source 8 is reflected off reflecting surface 150, through holes (not shown) positioned in the tape, through opening 138, hole 6 and onto photo transistor 106 when the tape cartridge is positioned in transport T. The tape in the tape cartridge is provided with holes at specified locations to indicate their location via the light-sensing means hereinabove described for selected use. The tape is typically divided into several sections with each section being identified via a corresponding number of holes in the tape at the beginning of each section. As the tape moves between reflecting surface 150 and opening 138, the light will pass through the holes onto photo transistor 106 so that information on a selected area or selected areas can be utilized as desired.

It will be obvious to those having ordinary skill in the art that many changes may be made in the details of the above-described preferred embodiments without departing from the spirit of the invention. Therefore, the scope of the present invention is to be determined by the following claims.

The invention is claimed in accordance with the following:

1. In combination, a transport and cartridge means;

said transport having a read/write means and driving capstan means at an inner end, light means disposed in said transport in alignment with a hole disposed in a section of said transport, light-sensing means provided in alignment with said hole;

said cartridge means having light reflecting means and openings in alignment therewith;

said light means, openings, hole and light-sensing means being coincident so that light from said light means passes through one of said openings of said cartridge, onto said light-reflecting means through apertures in information-carrying means of said cartridge means, through the other opening of said cartridge means and onto said light-sensing means through said hole; and latching means provided by said transport and said cartridge means latching said cartridge means in position in said transport in registration with said read/write means and said driving-capstan means.

2. The combination of claim 1 wherein switch means are provided on said transport connected to said driving-capstan means.

3. The combination of claim 1 wherein said cartridge means comprises spaced projection means defining a path therethrough along which a magnetic card moves when inserted into said path.

4. The combination of claim 1 wherein said cartridge means comprises reel means having an endless magnetic tape thereon and tape guide means for guiding said tape by said read/write means.

5. The combination of claim 1 wherein said driving-capstan means has a driving area comprising rubber-like material therealong and said cartridge means has pinch-roll means of hard material against which said driving area engages.

6. The combination of claim 1 wherein said transport comprises a one-piece member.

7. A card cartridge for disposition within a transport comprising:

a housing having spaced projection means therewithin defining a continuous path along which a magnetic card is to be moved, said housing providing an entrance to said path into which the card is introduced therein and an exit out which the card emerges, said housing having a first opening through which a read/write head extends and a second opening into which a driving capstan extends, both said first and second opening communicating with said path; and pinch-roll frame and spring means mounted in said housing and having pinch-roll means rotatably mounted in said pinch-roll frame, said pinch-roll means being normally disposed in said path in alignment with said second opening.

8. A card cartridge according to claim 7 wherein card-guide means is mounted in said housing in alignment with said first opening to wrap the magnetic card around the part of the read/write head disposed within said path.

9. A card cartridge according to claim 7 wherein light-reflecting means is disposed in said housing in alignment with apertures therein.

10. A card cartridge according to claim 7 wherein said pinch-roll frame and spring means comprises a one-piece member.

11. A one-piece pinch-roll frame and spring means for use in a card or tape cartridge comprising:

a mounting section for mounting said pinch-roll frame and spring means in a housing of a card or tape cartridge;

a spring section extending outwardly from said mounting section; and a pinch-roll frame at a free end of said spring section for mounting therein a pinch-roll member.

12. A one-piece pinch-roll frame and spring means according to claim 11 wherein said spring section extends outwardly from an end of said mounting section furtherest from said pinch-roll frame and extends along said mounting section.

13. A one-piece pinch-roll frame and spring means according to claim 11 wherein positioning means are provided on said mounting section and said spring section.

14. A transport for receiving thereinto a tape cartridge having an endless tape therein or a card cartridge having a path therethrough along which a magnetic card moves comprising:

a one-piece member having sides, a top and a bottom and defining a retangular shape in cross section for receiving the tape or card cartridge therein; and ridge means extending along an interior surface of one of said sides and said top or bottom to reduce the frictional engagement between the transport and the tape or card cartridge.

15. A transport according to claim 14 wherein spring means extend along another of said sides.

16. A transport according to claim 14 wherein latch means are provided in said bottom or said top for latching the card or tape cartridge in position in said transport and urging the card or tape transport against said ridge means of said top or bottom.

17. A transport according to claim 14 including a drive capstan, and motor means connected to said capstan for driving same.

18. A transport according to claim 17 wherein said drive capstan has a driving area provided with a rubber-like material therealong.

19. A transport according to claim 17 wherein switch means are provided adjacent an entrance to said transport for operating said motor means when the card or tape cartridge is inserted into said transport.

20. A magnetic card for use in a card cartridge and onto which information can be stored or read out, said magnetic card comprising:

a thin plastic member having a length to width ratio of at least about 10:1 to enable said member to be positioned in and moved along a path within the card cartridge; and magnetic material coated on substantially all of one surface of said plastic member to store or read out information stored thereby.

21. A magnetic card according to claim 20 wherein a hole is located in said member adjacent one end thereof.

22. A magnetic card according to claim 20 wherein a beveled edge is provided at one end of said member.

* * * * *